Aug. 30, 1966
C. S. BARNHART
3,269,052
DISPOSABLE RODENT BAIT STATION
Filed July 6, 1964
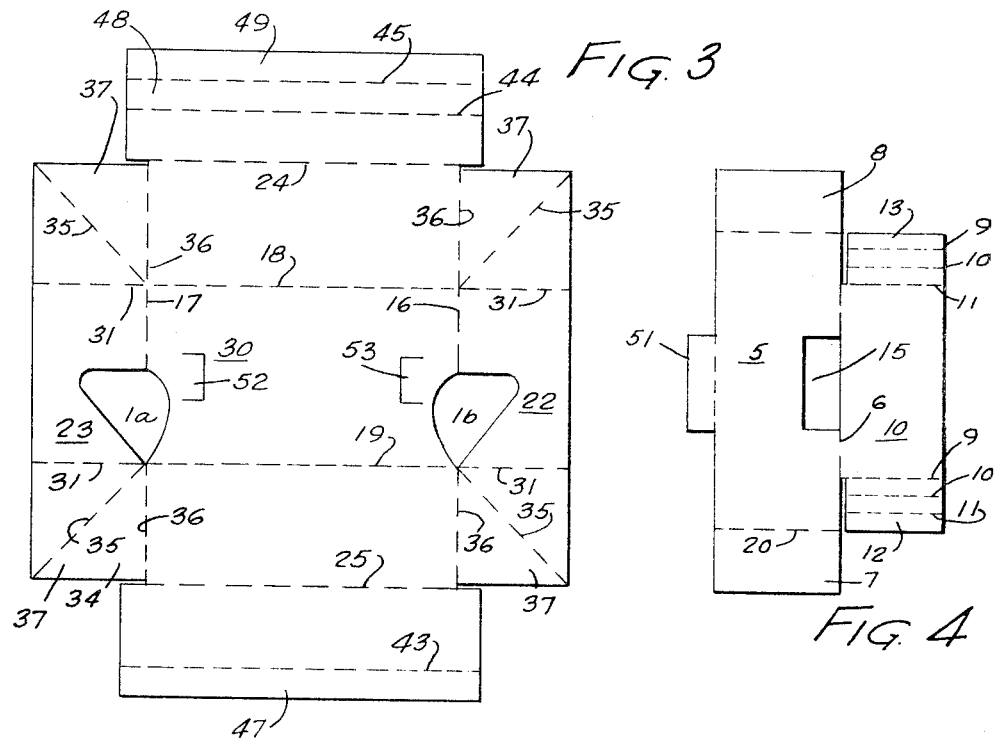
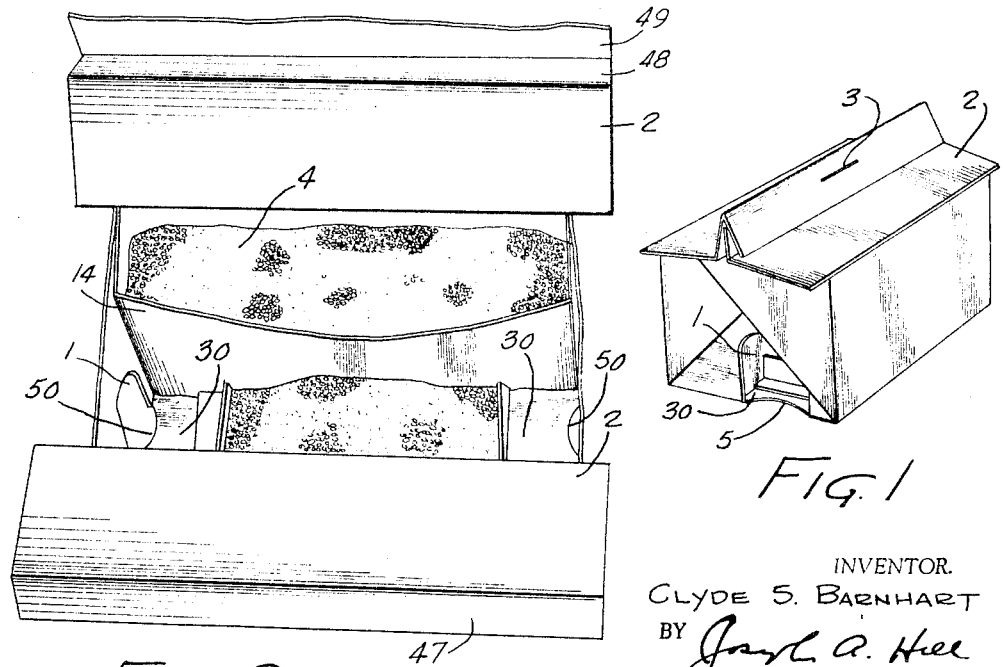
INVENTOR.
CLYDE S. BARNHART
BY Jack A. Hill
ATTORNEY United States Patent Office 3,269,052
Patented August 30, 1966

3,269,052
DISPOSABLE RODENT BAIT STATION
Clyde S. Barnhart, Joppa, Md., assignor to the United States of America as represented by the Secretary of the Army
Filed July 6, 1964, Ser. No. 380,711
2 Claims. (Cl. 43—131)

The invention described herein may be manufactured and used by or for the Government for governmental purposes without the payment to me of any royalty thereon.

The invention disclosed herein relates to the field of rodent control. Small rodents, particularly rats, lemmings, shrews, and mice, constitute a grave health menace in some localties. Further, these creatures cause a great deal of crop loss and other property damage. Due to the fact that they are also quite prolific, the control of their population presents a difficult problem.

One means of controlling the rodent population is by poisoning. However, this in turn creates problems because one must be careful in the administration of the poison to the rodents to avoid the untoward results quite commonly associated with reckless poisoning Therefore, it has been found that the use of toxic baits housed in containers accessible to animals of rodent size or smaller is prudent.

This invention is directed towards the problem of producing an economical but quite effective rodent bait station. Consequently, the invention is a rodent bait station which is easily produced from inexpensive, nonstrategic materials; to wit: a water resistant cardboard.

One object of this invention is to provide an effective rodent bait station which is lightweight, portable, inexpensive, and disposable.

Another problem relating to the construction of rodent bait stations of this type is that the rodent, by and large, is cautious and by nature a shy beast. This trait of the rodent personality often prevents or precludes the animal from choosing to yield himself to the enticements of the rodent bait station.

Therefore, it is another object of this invention to expose rodent bait in a bait station in such a manner as to make the toxic bait accessible and acceptable to shy rodents.

These and other objects of the invention will become apparent from the following disclosure taken together with the accompanying drawings in which:

FIG. 1 ilustrates the construction of the assembled rodent bait station;

FIG. 2 illustrates the interior of the rodent bait station revealing the feeding tray in a step in the assembly of the station prior to closing and stapling the top;

FIG. 3 represents the shape of the cardboard for the construction of the bait station and illustrates the lines of folding; and FIG. 4 represents the shape of the cardboard for the construction of the bait hopper and feeding tray which is placed in the bait station.

The rodent bait station is shown assembled in FIG 1. This drawing reveals one of the doors 1 of the station. The roof 2 is shown folded in place and stapled shut with the roof shutting staple 3.

FIG. 2 shows the roof 2 prior to folding it shut and stapling it closed. Note that the bait 4 appears behind the bait hopper wall 14. One of the entrance holes 1 is also revealed.

The construction of the bait station may be illustrated by reference to FIGS. 3 and 4. The basic materials from which the bait station may be made include paper, metal, or plastic. It has been found that a water resistant cardboard is quite satisfactory. Two sheets of water resistant cardboard are cut and folded in the following manner to construct the bait station.

The construction of the bait station is illustrated by reference to FIGS. 3 and 4. These two figures represent the two cardboard sheets from which the bait hopper and feeding tray assembly and the bait station outer shell assembly are made.

FIG. 4 represents the sheet of cardboard from which the bait hopper and feeding tray assembly is made. This sheet is cut to form two approximately adjoining rectangular portions. The smaller rectangular portion is the feeding tray floor 10. Walls at each end of the feding tray floor 10 are produced by folding upwards along lines 9, downwards along lines 10, and upwards along lines 11 to produce a ridge. The bait hopper wall 5 is produced by bending up along line 6. The bait hopper slot 15 is cut through the sheet to allow the bait to fall onto the bait feeding tray floor 10. The two ears 7 and 8 of the bait hopper wall are produced by bending along lines 20. These bait hopper ears 7 and 8 will be attached to the wall of the outer shell later in the process of assembly. The rectangular extension 51 forms a tab which will fit into the fold in the roof to secure the bait hopper wall to the roof of the bait station shell.

FIG. 3 represents the sheet from which the outer shell of the bait station is constructed. This sheet is cut out of one large sheet of cardboard with a large rectangular shape in the center which serves as the floor 30 of the bait station and adjacent to said large central rectangular shape there are four smaller rectangular shapes, one along each side of the central rectangular shape, which form the walls and the roof of the outer shell of the bait station. Two holes 1a and 1b are cut into this sheet which when the outer shell is assembled will be apertures of rodent size affording ingress and egress for the rodents.

The walls of the bait station shell are erected by bending upwards along lines 16, 17, 18, and 19. Simultaneously the corners are constructed by bending upwards along lines 31 and 36 and downwards along line 35 which at each corner produces a two-ply triangular section which is then bent back against the adjacent wall and stapled by a staple through the wall and through the two overlapping plies at point 37.

The next step in the process of assembly of the bait station entails placing the bait hopper and feeding tray assembly within the walls of the outer shell assembly. Referring to FIG. 2 it can be seen that the bait hopper wall 14 is placed vertically to the floor 30 of the outer shell assembly. The feeding tray floor 10 is positioned atop the floor 30 of the outer shell assembly and between the two doors 1a and 1b in the walls of the outer shell assembly The tabs 12 and 13 projecting from the feeding tray are placed in the pre-cut slits 52 and 53 in the floor 30 of the bait station to hold the feeding tray in place. The bait 4 is then placed in the bait hopper 5. The bait hopper ears 7 and 8 are stapled to the walls of the outer shell assembly.

The final step in the process of assembly of the rodent bait station is to close the roof. The roof is constructed by bending upwards along lines 24 and 25. The roof has a folded ridge in the center which is produced by bending downwards along lines 43 and 44 and upwards along line 45. The rectangular fold 47 is then placed within the envelope created by rectangular folds 48 and 49. At this point the extending rectangular tab 51 is also placed within the envelope created by rectangular folds 48 and 49 which are then secured together with a brass paper fastener at point 3 to close the roof.

The completely assembled rodent bait station is illustrated by FIG. 1. The roof 2 when completed is so constructed as to shed precipitation. There is an overlap above the ends in which the doors 1a and 1b are located. Further, there is an indentation 50 in the floor 30 of the outer shell of the bait station This indentation 50 has been found to be of great significance in two respects. First, the indentation assists in preserving the floor 30 of the bait station in that less moisture from precipitation will gather upon the floor 30. Secondly, this indentation is of importance in overcoming the natural shyness which it has been previously noted in a trait inherent in rodents. The rodent may enter partway into the rodent bait station without stepping up onto the floor of the bait station. Since rodents are naturally inclined to keep their feet on the ground, the fact that the rodent may do so as he enters the bait station reassures his anxieties to a certain extent and thus aids in inducing the shy beast to enter the rodent bait station. Further, since the bait station is constructed of cardboard rather than metal the rodent's feet will not contact cold metal upon entrance. This feature enhances the overall rodent acceptance qualities of the bait station. Further, the fact that the bait station is constructed in such a fashion as to allow the rodent to see through the container also increases rodent acceptance.

I claim:
1. A blank construction for a rodent bait station for dispensing rodent bait, comprising:
  (a) a single sheet outer shell blank comprising a floor section, a plurality of side and end wall sections extendable upwardly from said floor section, and roof sections comprising extensions which are adapted to overhang said end wall sections, said roof sections being formed from a continuation of said side wall sections, said side wall continuations being foldable upwardly and fastenable at their distal ends to form a carrying handle for said outer shell, said outer shell blank having an aperture in each of said end wall sections, each said aperture extending into said floor section to form an ingress and egress passageway through said outer shell which permits rodents to partially enter said outer shell without contacting said floor; and

(b) a single sheet combined bait hopper and feeding tray blank insertable within said outer shell, the bait hopper portion of said last mentioned blank comprising a side wall portion adapted to be inclined upwardly from the floor to the roof of said outer shell, said side wall portion including a tab at its upper end which is adapted to extend into the handle portion of said outer shell to fasten said side wall portion to said shell, end tabs foldable parallel to the side walls of said outer shell to form the bait hopper, and there being an aperture at the lower end of said side wall portion to permit dispensing of bait from said hopper to the feeding tray portion, said feeding tray portion comprising a floor section which is a foldable continuation of the side wall portion of said bait hopper, and end wall sections which are foldable upwardly from said tray floor section to form the feeding tray.

2. A rodent bait station formed from the blank construction described in claim 1 wherein said end and side wall sections have extensions, the end and side wall sections of said outer shell are fastened together in an upright position by said wall extensions which are overlapped and folded over and stapled to at least one pair of said walls, and wherein said outer shell handle and bait hopper side wall portion are fastened together by stapling, and wherein the end wall extensions of said feeding tray further comprise tabs which extend through slots provided in the floor of said outer shell to secure the feeding tray to said shell floor.

References Cited by the Examiner
UNITED STATES PATENTS

| | | | |
|---|---|---|---|
| 1,856,200 | 5/1932 | Tippey | 43—131 |
| 3,045,387 | 7/1962 | Simpson | 43—131 |
| 3,130,891 | 4/1964 | Wieke | 229—16 |

ABRAHAM G. STONE, *Primary Examiner.*

R. L. HOLLISTER, *Assistant Examiner.*